United States Patent [19]
Riegler

[11] 3,887,248
[45] June 3, 1975

[54] SLIDE-ARTICULATION BEARING FOR TILTABLE CONVERTERS

[75] Inventor: Ernst Riegler, Enns, Austria

[73] Assignee: Vereinigte Osterreichische Eisen-und Stahlwerke - Alpine Montan Aktiengesellschaft, Linz, Austria

[22] Filed: Mar. 27, 1973

[21] Appl. No.: 345,292

[30] Foreign Application Priority Data
Mar. 28, 1972 Austria .............................. 2664/72

[52] U.S. Cl. .................................. 308/15; 308/176
[51] Int. Cl. ....................... F16c 13/04; F16c 17/10
[58] Field of Search ...................... 308/15, 176, 194

[56] References Cited
UNITED STATES PATENTS
| | | | |
|---|---|---|---|
| 3,523,714 | 8/1970 | Puhringer | 308/176 |
| 3,602,560 | 8/1971 | Memmel | 308/72 |

FOREIGN PATENTS OR APPLICATIONS
| | | | |
|---|---|---|---|
| 728,039 | 2/1966 | Canada | 308/176 |

*Primary Examiner*—Evon C. Blunk
*Assistant Examiner*—Robert Saifer
*Attorney, Agent, or Firm*—Brumbaugh, Graves, Donohue & Raymond

[57] ABSTRACT

A slide-articulation bearing for tiltable converters is provided. It comprises slide elements which are fixed in recesses of a cage provided between the inner ring and the outer ring of the articulation bearing, the slide elements in the cage being framed by e.g. supporting rings, and the inner ring lying on the slide faces of the slide elements. The outer ring, which is preferably made of an unalloyed, hardened (quenched) and tempered carbon steel with a strength of 55 to 70 kp/mm$^2$, is designed as slide bushing, so that the articulation bearing is axially displaceable within the bearing housing.

11 Claims, 3 Drawing Figures

SLIDE-ARTICULATION BEARING FOR TILTABLE CONVERTERS

The invention relates to a slide-articulation bearing for tiltable converters comprising slide elements, preferably made from plastic material, which are fixed in recesses of a cage provided between the inner ring and the outer ring of the articulation bearing, the slide elements in the cage being framed by particular means, e.g. metal supporting rings, and the inner ring lying on the slide faces of the slide elements.

Converters are used for the production of steel from liquid pig iron by using oxygen as refining material. In order to obtain an economical steel production, it is attempted to keep the capacity of the converter as great as possible. Today there are plants which may receive 300 mt (metrictons) liquid metal and provisions are made to build converters with a tapping weight of up to 500 mt (metrictons). In such converters the total weight of the refractory lined refining vessel inclusive of the steel amounts to more than 1300 mt (metrictons), which weight has to be supported by the bearings. The bearing construction thus has to accommodate high radial loads. Owing to their exposure to great heat the tilting or bearing trunnions, respectively, may be distorted, so that a drunken movement results, which has to be absorbed by the bearing in each rotation. Further, a bearing construction has to cope with longitudinal displacements in axial direction and axial forces connected therewith; temperature changes in the converter cause longitudinal displacements in the magnitude of several centimeters in the axis of the carrier trunnion which may vary with the converter size. In order to be able to accommodate these displacements, the bearing construction has to incorporate a movable bearing which is designed in a manner so as to withstand the forces occurring in a longitudinal displacement and thus prevent any damaging of the bearing construction. A longitudinal displacement may occur both during tilting of the converter and during its standstill. Finally, one of the most important demands placed in a converter bearing is that it may rapidly be exchanged in case of damage for which it is a prerequisite that the bearing is designed in several parts.

These demands are substantially met by a bearing construction as described in the Austrian Pat. Specification No. 274,870. This bearing construction provides pendulum roller bearings, the inner ring of the movable bearing being rigidly fixed on the tilting trunnion and the outer ring being supported in a slide bushing which is axially displaceable relative to the housing surrounding the entire bearing construction. Between the slide bushing and the housing a protecting bushing may be provided which is made of harder material than the slide bushing.

The bearing construction according to the Austrian Pat. Specification No. 274 870 seems to warrant improvements in so far as the construction height of the pendulum roller bearing is relatively great; further, the slide bushing is a separate construction part which has to be connected with the outer ring made of hardened steel, whereby the construction height of the outer diameter of the bearing construction is further increased and the weight grows with about the square of the bearing diameter; also the carrying capacity of the pendulum roller bearing is relatively small, because between the rollers and the inner ring or the outer ring, respectively, the load is transferred only on one line; since pendulum roller bearings are completely made of hardened steel, the bearings, in particular the rollers, are sensitive against severe shock loads which frequently occur in steel working operation and lead to roller fractions; pendulum roller bearings have to be carefully serviced, i.e. the rollers have to be sufficiently lubricated; also, pendulum roller bearings are per se very expensive structural elements.

It is already known to use instead of self-aligning roller bearings, articulation slide bearings with inserted slide plates of plastic material. These plastic material slide plates are arranged in recesses of a cage provided between the inner ring and the outer ring in a manner that the ring rests only on the slide faces of the plastic material slide plates, the slide plates being framed at the projecting parts by particular means, e.g. rings or the like (German Utility Pat. No. 7 139 476).

It is the task of the invention to unite the advantages of these two known bearing constructions and to create an improved bearing construction which is composed of fewer parts, which parts are to be designed in a manner that the heat radiation in radial direction from the trunnion to the bearing housing is improved and that moreover a smaller construction height is obtained. Also, the construction costs are to be substantially reduced.

In the slide articulation bearing defined in the introduction, the invention resides in that the outer ring which is preferably made of an unalloyed, hardened quenched and tempered carbon steel with a strength of 55 to 70 kp/mm$^2$ is designed as slide bushing, so that the articulation bearing is axially displaceable within the bearing housing. It is suitable to unite the slide bushing with the outer ring of the articulation bearing to a single construction part only if — compared to hardened roller bearings — the strength (hardness) of the outer ring is reduced. In articulation bearings with plastic slide plates, a high carrying load is received owing to the enlargement of the spherical carrying faces compared to anti-friction bearings, so that only the inner ring has to be produced from hardened, wear resistant steel, while the outer ring may be produced from a much softer material. Thus, the outer ring may function as slide bushing, its slide faces being preferably enlarged relative to the plastic slide plates, i.e. broadened. A broadened slide face of the slide bushing improves also the heat radiation from the trunnion to the bearing housing.

A further embodiment of the invention resides in that bolts or pins made of a material which conducts heat well, e.g. copper, are imbedded in the outer ring, which bolts or pins project into the slide elements and extend to the slide face of the slide bushing.

The slide face of the slide bushing may be made of a sliding material, e.g. bronze, the sliding material being connected with the outer ring (the slide bushing) preferably by deposit welding without joints.

In order that the invention may be more fully understood, it shall now be further explained with reference to the accompanying drawings.

Figure 1:
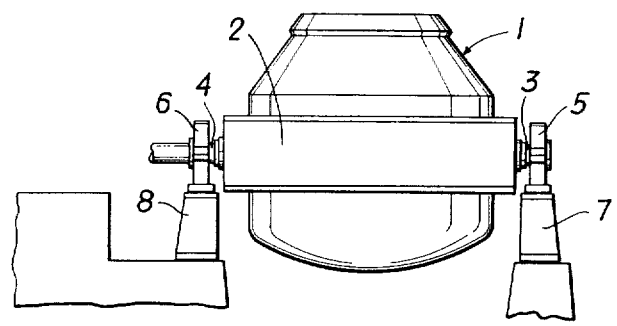
FIG. 1 is a front view of a converter with its bearing construction.

In FIG. 1, numeral 1 denotes the converter mounted in a carrying ring 2. On the carrying ring 2 the pivoting or tilting trunnions 3 and 4 are secured which are supported in the bearings 5 and 6. Numeral 5 denotes the movable bearing and numeral 6 the fixed bearing. Numeral 7 and 8 are stanchions on which the bearings 5,6 are mounted.

Figure 2:
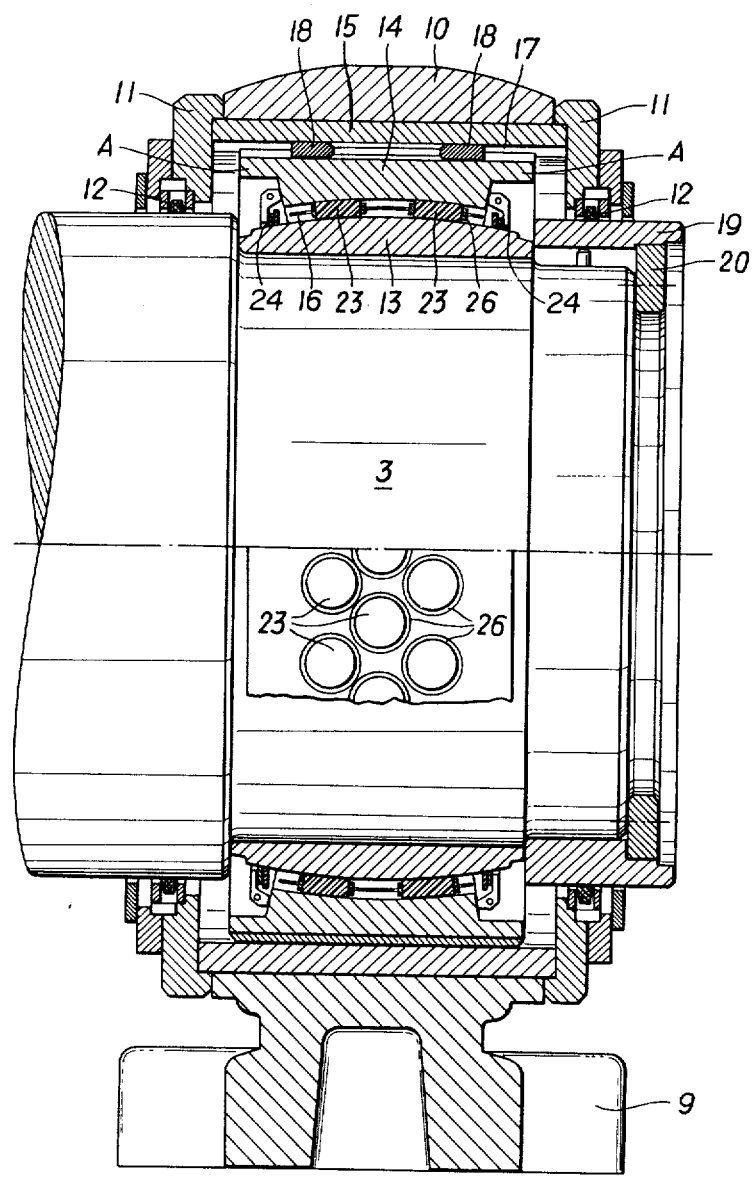
FIG. 2 is a vertical sectional view of the movable bearing.

The movable bearing 5 according to the invention is illustrated in FIG. 2. It comprises in detail the bearing foot 9, the bearing cover 10, the lateral covers 11, the sealings 12, the inner ring 13 and the outer ring 14. The outer ring 14 is suitably made of an unalloyed, hardened (quenched) and tempered carbon steel with a strength of 55 to 70, preferably 55 to 60 kp/mm$^2$, and designed as a slide bushing according to the invention, while the inner ring — similar to anti-friction bearings — is made of a hardened, wear resistant steel. Numeral 15 denotes a protection bushing provided according to an embodiment which is rigidly connected with the bearing cover 10. The tilting trunnion 3 thus may slide in axial direction together with the articulation bearing. The outer ring 14 is provided on both sides with projections A which enlarge the slide bushing. The outer ring 14 is provided at the inner side with a cage 16 made e.g. of the same material, which cage carries slide plates 23 made e.g. of plastic material.

In order to secure the enlarged outer ring 14 of the movable bearing relative to the protection bushing 15 against torsion, axial grooves 17 are provided with fitting keys 18 inserted therein. Further, grooves, not shown, are provided in circumferential direction, through which a lubrication agent may be supplied between outer ring (slide bushing) 14 and protection bushing (15). At the end of the trunnion 3 covers 19,20 are provided which function also as additional securing means for the inner ring 13.

The sliding plates 23 have a cylindrical form and are framed within the cage 16 by supporting rings 26 which are preferably made of a bronze material. Suitably the axial extension of the slide plates 23 is somewhat greater than that of the supporting rings 26, i.e. as much as the slide plates 23 yield when the bearing is loaded, so that the supporting rings 26 also participate in the load transfer. The slide plates 23, which coact with the surface area of the spherical inner ring 13, are thus completely framed so that also with higher temperatures — when plastic material is used — no creeping or flowing may occur. For the particular protection of the slide plates 23 sealings 24 are provided at both sides of the outer ring 14.

By combining the slide bushing with the outer ring to an integral structural part 14 the entire bearing may be produced more cheaply and the construction height is reduced considerably; in addition to that the heat radiation from the trunnion 3 outwardly to the housing is greatly improved so that the temperature of the slider plates 23, if they are made e.g. of plastic material may easily be maintained below the temperature of about 150°C which is maximally permissible with such material. The improved heat dissipation is substantially due to the reduction in the number of the partition lines between the trunnion 3 and the bearing cover 10 or the bearing foot 9.

Figure 3:
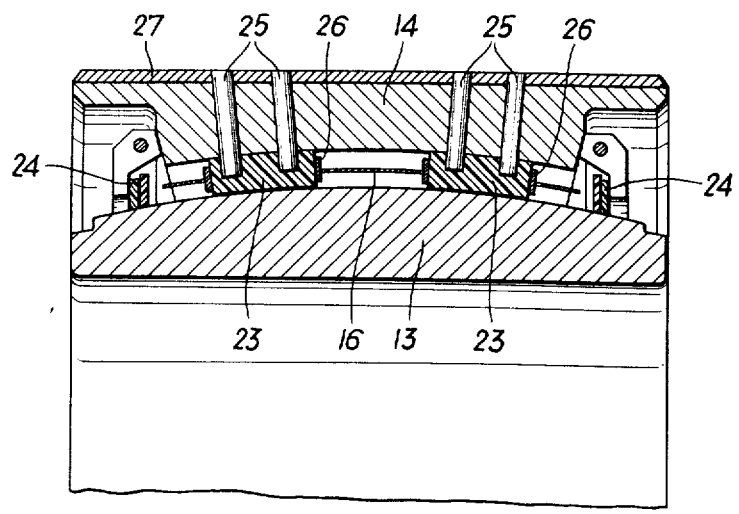
FIG. 3 is a similar representation of a further embodiment according to the invention.

For improving the heat dissipation, in the embodiment according to FIG. 3, several bolts or pins 25 are arranged in the outer ring 14 in a manner that their lower ends lie at a distance from the inner face of the slide plates. These bolts 25 are made of a material which conducts heat well, e.g. copper, and they conduct the heat from the inner ring 13 immediately to the surface of the outer ring 14 designed as a slide bushing. The slide face of the outer ring 14 may also be made of a bronze sliding material 27 which, in order to avoid a partition line, is suitably applied by deposit welding, so as to connect it with the outer ring 14 rigidly and continuously. By the bronze-sliding material 27, the bearing according to the invention obtains properties necessary to withstand emergency stresses. The sliding plates 23 are framed by supporting rings 26 in the cage 16. Numeral 24 denotes sealings which are to prevent the intrusion of dirt and foreign bodies into the slide plates 23. On principle, it is not necessary to lubricate the articulation bearing.

The slide plates 23 may be made also of another sliding material, e.g. of a sintered material, such as sintered bronze.

What I claim is:

1. A slide-articulation bearing for tiltable converters comprising a bearing housing, and in said housing an inner ring, an outer ring, and between said inner and outer rings a cage having recesses, and slide elements fixed in said recesses, framed by particular means and supporting on their slide faces the inner ring; the outer ring being designed as a slide bushing and having on an outer circumference at least one slide face integral with the outer ring, so that the bearing is axially displaceable within the bearing housing, the outer ring being made of unalloyed, quenched and tempered carbon steel with a strength of 55 to 70 kp/mm$^2$.

2. The slide-articulation bearing set forth in claim 1, wherein said slide elements are made of plastic material.

3. The slide-articulation bearing set forth in claim 1, wherein said particular means are metal supporting rings.

4. The slide-articulation bearing set forth in claim 1, wherein the slide face of the outer ring is broadened relative to the slide elements.

5. The slide-articulation bearing set forth in claim 1, wherein bolts of material which conducts heat well are inbedded in the outer ring to extend from the slide face of the outer ring and project into the slide elements.

6. The slide-articulation bearing set forth in claim 5, wherein said bolts are made of copper.

7. The slide-articulation bearing set forth in claim 1, wherein the slide face of the outer ring is made of a sliding material.

8. The slide-articulation bearing set forth in claim 7, wherein the sliding material is connected with the outer ring by deposit welding without joints.

9. A slide-articulation bearing for tiltable converters comprising:
   a. bearing housing;
   b. an inner ring located within the housing;
   c. an outer ring located within the housing;
   d. a cage located between the inner and outer rings and having recesses formed in it;
   e. slide elements fixed in the recesses and supporting on their slide faces the inner ring;
   f. means framing the slide elements in the cage; and
   g. a plurality of means imbedded in the outer ring for conducting heat;
   the outer ring being designed as a slide bushing and having on an outer circumference at least one slide face, so that the bearing is axially displaceable within the bearing housing, and the heat conducting means extending from the slide face of the outer ring and projecting into the slide elements.

10. The slide-articulation bearing set forth in claim 9, wherein the heat conducting means are made of copper.

11. A slide-articulation bearing for tiltable converters comprising:
  a. a bearing housing;
  b. an inner ring located within the housing;
  c. an outer ring located within the housing;
  d. a cage located between the inner and outer rings and having recesses formed in it;
  e. slide elements fixed in the recesses and supporting on their slide faces the inner ring; and
  f. means framing said slide elements in the cage, the outer ring being designed as a slide bushing and having on an outer circumference at least one slide face, so that the bearing is axially displaceable within the bearing housing, the slide face of the outer ring being made of a sliding material that is connected with the outer ring by deposit welding without joints.

* * * * *